(12) United States Patent
Dinh

(10) Patent No.: US 6,215,937 B1
(45) Date of Patent: Apr. 10, 2001

(54) ADJUSTABLE FIBER OPTIC STRAND STORAGE UNIT

(75) Inventor: Cong Thanh Dinh, Memphis, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/401,910

(22) Filed: Sep. 23, 1999

Related U.S. Application Data

(60) Provisional application No. 60/101,591, filed on Sep. 24, 1998.

(51) Int. Cl.[7] .................................................. G02B 6/00
(52) U.S. Cl. ................................................ 385/134; 385/135
(58) Field of Search .................................. 385/134, 135, 385/136, 137

(56) References Cited

U.S. PATENT DOCUMENTS

| | | | |
|---|---|---|---|
| 4,695,677 | 9/1987 | Ruth et al. ............................. | 194/45 |
| 4,900,121 | 2/1990 | Becker et al. ........................ | 350/96.2 |
| 4,900,123 | 2/1990 | Barlow et al. ........................ | 350/96.2 |
| 5,013,121 | 5/1991 | Anton et al. ......................... | 350/96.2 |
| 5,092,663 | 3/1992 | Hivner .................................. | 385/100 |
| 5,268,986 | 12/1993 | Kakii et al. ........................... | 385/135 |
| 5,375,185 | 12/1994 | Hermsen et al. ..................... | 385/135 |
| 5,408,571 | 4/1995 | Kaplan ................................. | 385/135 |
| 5,421,532 | 6/1995 | Richter ................................. | 242/399.2 |
| 5,867,624 | * 2/1999 | Forrester et al. ..................... | 385/134 |

OTHER PUBLICATIONS

Multilink Technologies Group, 580 Ternes Ave., P.O. Box 955, Elyria, OH 44035 "1999 Fiber Optic Outside Plant Catalog—Ordering Guide" Pertinent Pages: 19 –27.

* cited by examiner

*Primary Examiner*—Cassandra Spyrou
*Assistant Examiner*—Euncha Cherry
(74) *Attorney, Agent, or Firm*—Hoffman & Baron, LLP

(57) ABSTRACT

An adjustable cable storage unit utilized in the aerial installation of a cable on a utility pole or other support structure whereby a predetermined extra length of cable slack is aerially stored and maintained in a generally planar loop as part of the initial installation of the cable. The cable storage unit is comprised of a bracket and a channel positioned about the outer periphery of the bracket for receiving and guiding a portion of the predetermined length of cable slack which includes an arcuate section and two converging linear sections for guiding the portion of predetermined length of cable slack to and from the arcuate section. The storage unit further includes a cross member which may be selectively adjusted to vary the diameter of the arcuate section to accommodate the bending radii of a variety of cables.

6 Claims, 5 Drawing Sheets

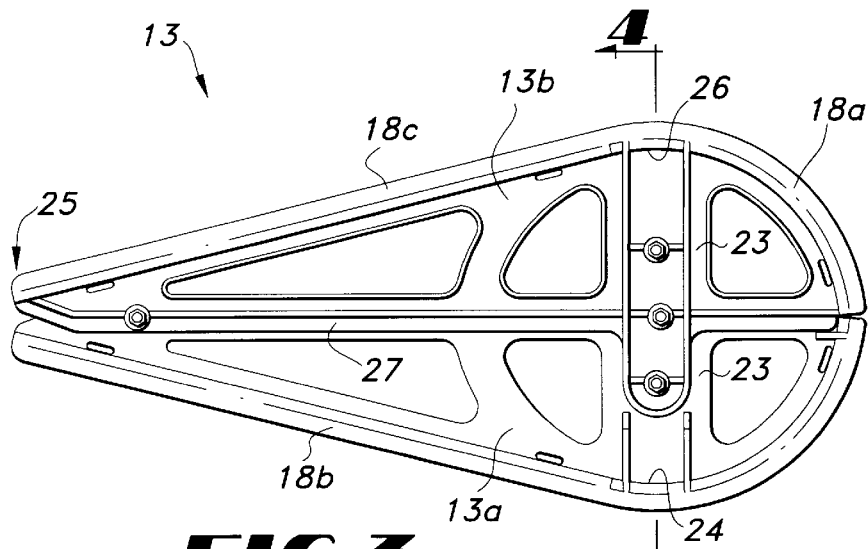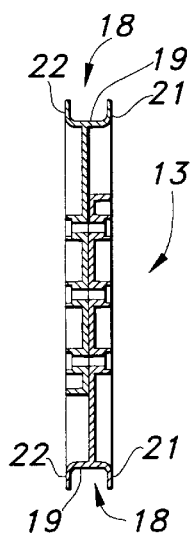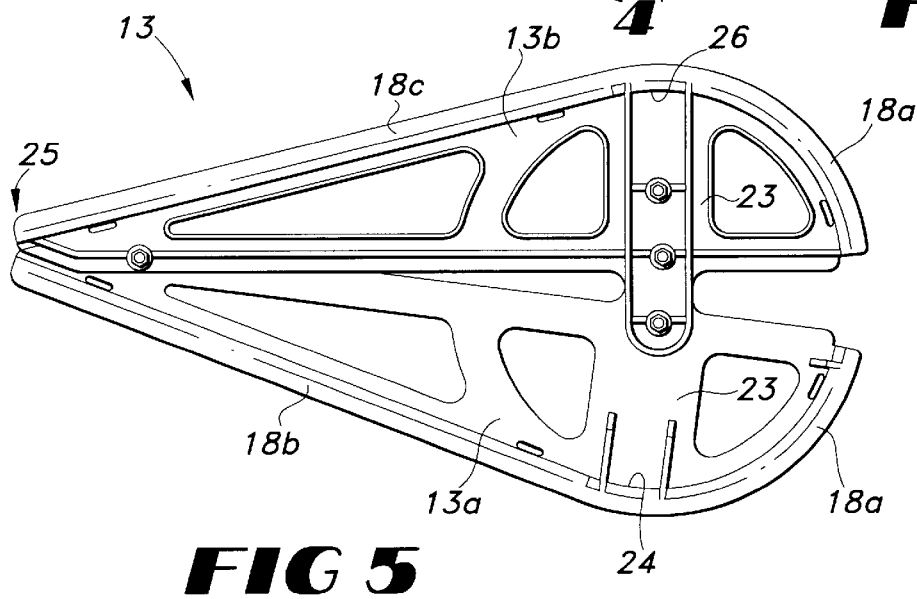

ADJUSTABLE FIBER OPTIC STRAND STORAGE UNIT

CROSS-REFERENCE TO RELATED APPLICATIONS

This application claims priority under 35 U.S.C. §119(e) to provisional patent application Ser. No. 60/101,591 filed Sep. 24, 1998, the disclosure of which is incorporated herein by reference.

FIELD OF THE INVENTION

The present invention relates generally to a support apparatus, and more particularly, to a cable storage unit and method for storing an extra length of fiber optic cable or the like when such cable is aerially installed on utility poles or other support structures. In even greater particularity, the present invention relates to an adjustable fiber optic strand storage unit that can be adjusted to accommodate a variety of different bend diameters of an assortment of fiber optic cable.

BACKGROUND OF THE INVENTION

Developments in lightwave technology continue today at a rapid pace. Such advances have improved the system performance and reduced cost of fiber optic cables and associated optoelectronic equipment, which carry information over hair-thin strands of glass instead of conventional metallic media. Consequently, because of these considerations and additional performance advantages as well, fiber optic cable has supplanted copper wire as the preferred transmission medium in many telecommunications applications.

Initially, fiber optic cable was installed only in long-distance, intercity networks and interoffice trunks. Today, however, such cable is being placed in the local loop feeder network. Future applications will extend fiber optic cable for distribution to the customer premises itself In fact, a proliferation of new information services is now available, or is being proposed for the office and home by local telephone companies and cable TV companies, to take advantage of the high communication capacity that fiber optic cable offers. Such interactive services include, for example, local area networks (LANs), educational/entertainment video, energy management, alarm monitoring and home banking.

Relief of congested transmission facilities and demand for the above-identified information services will require placement of new fiber optic facilities, especially aerial cable installations in less populated areas, where such facilities are geographically dispersed, where terrain or construction conditions dictate, or where other economic reasons dictate.

Notwithstanding the advantages of fiber optic cable and increased demand, there are still drawbacks to universally using fiber optic cable instead of conventional metallic media. First, fiber optic cable is more fragile than copper wire or coaxial cable. In addition, fiber optic cable is more sensitive to pulling, bending and crushing forces. Accordingly, fiber optic cable demands more stringent installation and maintenance techniques than those media. If the cable is otherwise mishandled, portions of the cable have to be replaced because broken, crushed or kinked cables result in degraded transmission performance. The time and expense and inconvenience to customers associated with replacing or relocating aerially-installed fiber optic cable is substantial. This is due to high manpower requirements and the use of expensive equipment needed to install, test and maintain such transmission facilities. Those skilled in the art have not yet addressed the need to reduce the costs and inefficiencies associated with such activity after initial installation of fiber optic cable is completed.

As is well known, for the purpose of maintenance and service, there are advantages for aerially storing an extra length of cable in a fiber optic transmission line. The extra length of cable is commonly stored by looping it around the outer periphery of an aerial device which is hung from a support messenger strand for the fiber optic line, or, alternatively, mounted on a transmission line pole. In a known device, a generally U-shaped channel, constituting the outer periphery of the aerial device, forms a guide for the cable along the sides and the return arc portion of the device. In this arrangement, a workman bends a strand of cable around the outside periphery of the device to put it into storage.

Typically, the most important fiber optic cable parameter is its bending radius. When a fiber optic cable is being installed, and when it is finally in place, the cable must not be bent less than the minimum cable bending radius specified by the manufacturer. Of course, there are many types of fiber optic cable having different bending radii. So the issue becomes trying to accommodate the different bending radii when aerially installing different fiber optic cable. The type of known device mentioned above is a one piece device having a fixed bend diameter, therefore can only accommodate a limited number of bend radii of fiber optic cable. Thus, different sized devices must be available and utilized in the field.

It is, therefore, an object of the present invention to provide an adjustable fiber optic strand storage unit and method in the industry that will eliminate the need for different sized units to accommodate different bending radii of a variety of fiber optic cable.

Another object of the present invention to provide an adjustable fiber optic strand storage unit and method in the industry that will inexpensively support and maintain an extra length of fiber optic cable slack in an aerial installation.

Still, another object of the present invention is to provide such a storage unit that is adjustable to accommodate a variety of different bending radii of an assortment of fiber optic cable.

A further object of the present invention is to provide an aerial storage unit of the type described, which can be readily molded or formed, and which preferably minimizes or eliminates electrical hazards to workmen when handling the storage unit near electrical transmission lines and other electrical problems such as lightning.

SUMMARY OF THE INVENTION

To achieve the foregoing objects and advantages, and in accordance with the purposes of the invention as embodied and broadly described herein, the present invention addresses the above needs by providing an adjustable cable storage unit utilized in the aerial installation of a cable on a utility pole or other support structure whereby a predetermined extra length of cable slack is aerially stored and maintained in a generally planar loop as part of the initial installation of the cable. The cable storage unit is comprised of a bracket; a channel means positioned about the outer periphery of the bracket for receiving and guiding a portion of the predetermined length of cable slack which includes an arcuate section and two converging linear sections for guiding the portion of predetermined length of cable slack to and from the arcuate section. The storage unit further includes a means for selectively adjusting the diameter of the arcuate section to accommodate the bending radii of a variety of cables. The bracket may be formed from two separate opposing hermaphroditic pieces which are generally symmetrical about a longitudinal centerline of the bracket. The unit may further include at least one attachment means for aerially securing said bracket to a messenger cable.

The present invention also provides an adjustable cable storage unit utilized in the aerial installation of a cable on a utility pole or other support structure whereby a predetermined extra length of cable slack is aerially stored and maintained in a generally planar loop as part of the initial installation of said cable. The unit includes a bracket having first and second ends; a channel means positioned about the outer periphery of the bracket for providing an essentially planar storage loop. The channel means includes a bottom surface, opposing side walls extending away from the bottom surface, and an open top, for receiving a portion of the predetermined extra length of cable slack between the side walls. The channel means further defines a generally arcuate section extending about the first end of said bracket to provide a return arc portion for the stored portion of the predetermined extra length of cable slack, and linear sections on opposite sides of the bracket. The linear sections converge from the ends of the arcuate section toward the second end for storing a further portion of the predetermined extra length of cable slack between the arcuate section and the second end. A centerline support member extends from the first and second ends of the bracket generally along a longitudinal centerline. A support cross member extends across the ends of the arcuate section. The cross member includes a means for adjusting the diameter of said arcuate section to accommodate the bending radii of a variety of cables.

The bracket may be formed from two separate opposing hermaphroditic pieces which are generally symmetrical about a longitudinal centerline of the bracket. Each of the pieces includes a separate member which cooperate when the pieces are mated to form the cross member. The means for adjusting the diameter of the arcuate section may comprise an array of bolt openings through each member of the opposing pieces wherein the bolt openings are selectively aligned to adjust the diameter of the arcuate section.

The accompanying drawings, which are incorporated in and constitute a part of the specification, illustrate preferred embodiments of the invention and, together with the general description given above and the detailed description of the preferred embodiments below, serve to explain the principles of the invention.

BRIEF DESCRIPTION OF THE DRAWINGS

The features of this invention which are believed to be novel are set forth with particularity in the appended claims. The invention, together with its objects and advantages thereof, may be best understood by reference to the following detailed description taken in conjunction with the accompanying drawings in which like reference numerals identify like elements in the figures and in which:

FIG. 3 is a top plan view of the storage unit of FIG. 1 shown in a first closed mated or engaged position embodying features of the present invention;

FIG. 4 is a sectional view taken along line 4—4 of FIG. 3 embodying features of the present invention;

FIG. 5 is a top plan view of the apparatus of FIG. 1 shown in a second closed mated or engaged position embodying features of the present invention;

DETAILED DESCRIPTION

Figure 1:
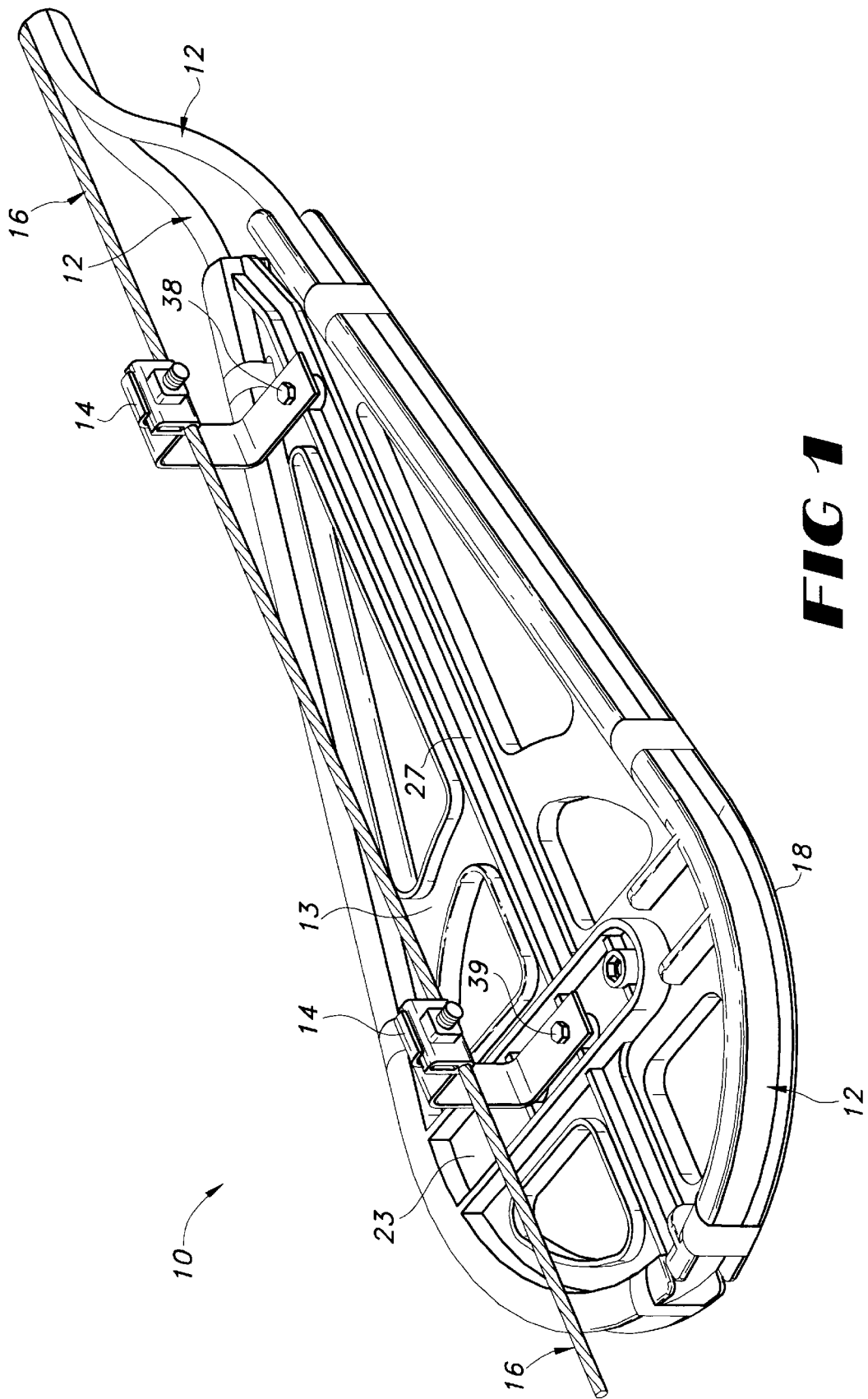
FIG. 1 is a perspective view of an adjustable fiber optic strand storage unit for maintaining and storing an extra length of fiber optic cable slack or the like embodying features of the present invention.

Referring to the drawings, a representative adjustable fiber optic strand storage unit, embodying various features the present invention, is generally indicated throughout the figures by reference character 10. As seen throughout the figures, and more fully described below, storage unit 10 is preferably utilized in an aerial installation of fiber optic cable 11 or the like, whereby a predetermined extra length of cable slack 12 is aerially stored and maintained as part of the cable's initial installation. The fiber optic cable 11 typically placed in aerial installations is a single-mode, dielectric central member, non-armored loose tube type having from 4 to 144 fibers. The term "slack," as used throughout this specification, refers to any excess length of cable 11, wire, or the like which allows excessive sag.

Figure 2:
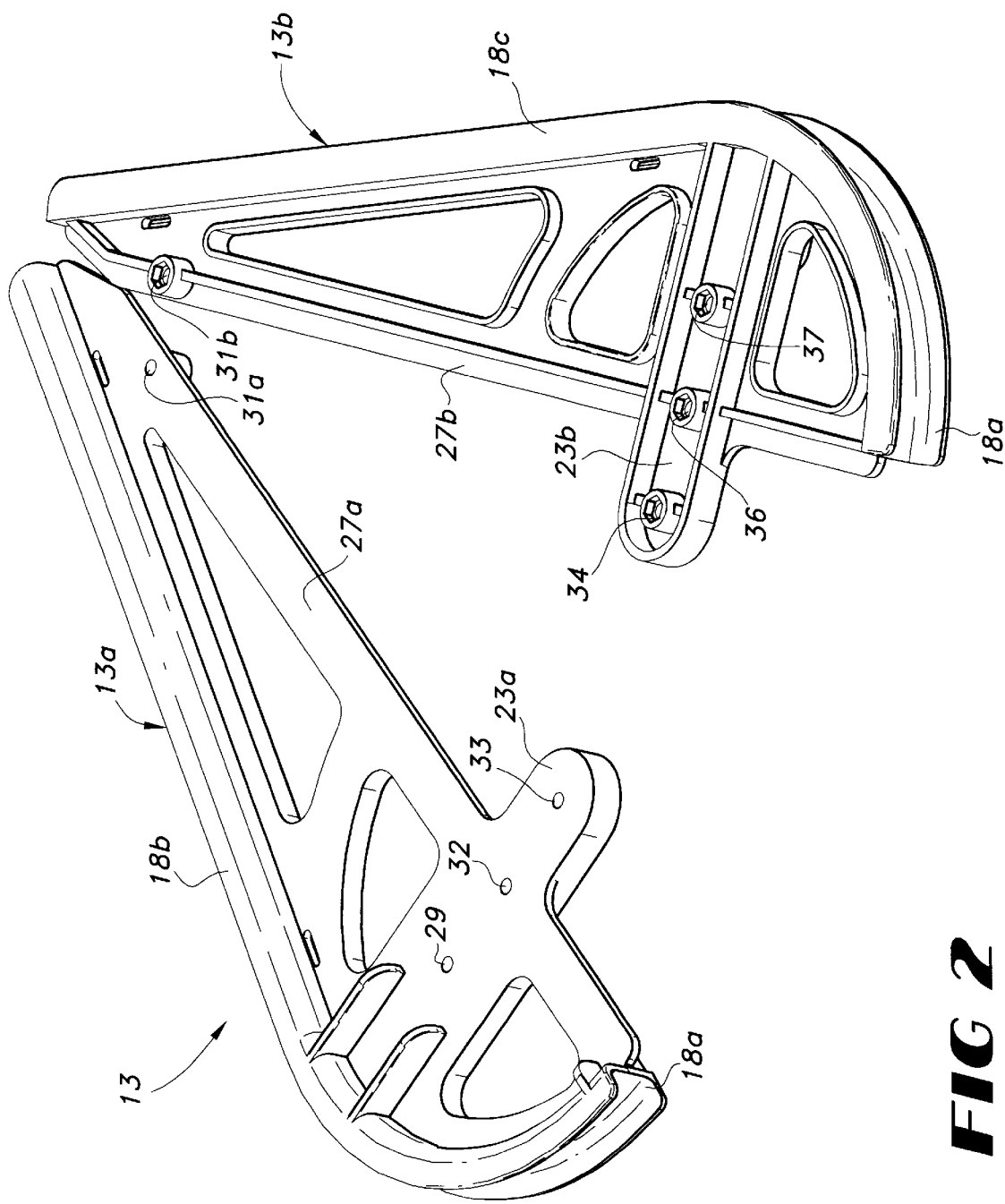
FIG. 2 is a perspective view of the storage unit of FIG. 1 shown in an open nonmated position embodying features of the present invention.

Referring to FIG. 1, storage unit 10 comprises a bracket 13 for storing and guiding a predetermined extra length of cable slack 12 and at least one attachment means 14 for aerially securing bracket 13 to a messenger cable 16, utility pole 17 or other support structure. In a preferred embodiment, as best shown in FIG. 2, bracket 13 is comprised of two separate opposing pieces 13a and 13b, discussed more fully below, which are conventionally molded from a glass reinforced Nylon or other suitable material capable of withstanding harmful sunlight radiation and a wide temperature range without cracking or breaking. Both pieces 13a and 13b are generally symmetrical about a longitudinal centerline of bracket 13 and are designed to be hermaphroditic, that is, only one mold is necessary to form both pieces 13a and 13b which cooperate to form bracket 13. Accordingly, the relatively few parts necessary to assemble bracket 13 and its simple design minimize the cost of manufacturing the invention.

The outer periphery of bracket 13 includes a channel means 18, which may be generally U-shaped as shown throughout the figures, for receiving and guiding a portion of the predetermined extra length of cable slack 12. Channel means 18 has a bottom surface 19 and opposing side walls 21, 22 extending upwardly from each side thereof. Moreover, channel means 18 is shaped to form a generally semicircular arcuate section 18a and two opposed converging linear sections 18b, 18c. In a preferred embodiment, arcuate section 18a communicates smoothly and tangentially at its opposite ends 24, 26 with linear sections 18b and 18c, respectively. Linear sections 18b and 18c are positioned on opposite sides of bracket 13 and converge toward the relatively narrow entering and exiting end 25 of bracket 13 so that the entering and exiting portions of cable slack 12 are in proximate positions along side each other.

Generally speaking, arcuate section 18a of channel means 18 provides the return arc or loop portion of bracket 13 for the cable slack 12. Arcuate section 18a is constructed of an appropriate diameter to provide a bending surface for the fiber optic cable 11. The diameter requirements of arcuate section 18a as it relates to the minimum bending radii of fiber optic cable are well understood by those skilled in the field of fiber optic cable handing.

Referring to FIG. 2, pieces 13a and 13b of bracket 13 respectively include support cross members 23a, 23b and centerline support members 27a, 27b. Once pieces 13a, 13b are joined to form bracket 13, cross members 23a, 23b and centerline members 27a, 27b become generally aligned to form a single support cross member 23, which extends across the diametrically-opposed ends 24, 26 of arcuate section 18a, and a single centerline support member 27, respectively.

In use, the storage unit 10 is preferably suspended horizontally in a conventional manner from a support messenger cable 16 using at least one attachment means 14. In a preferred embodiment, as most clearly illustrated in FIG. 1, storage unit 10 utilizes two attachment means 14 which are comprised of conventional horizontal tap brackets. These brackets have flat metal bottoms which are bolted to the top side of bracket 13. Each cross member 23a and 23b includes an array of bolt openings, preferably three, designated as 29, 32, 33 and 34, 36, 37, respectively, for use in bolting a first attachment means 14 to the top side of bracket 13. Similarly, each centerline member 27a and 27b include bolt openings 31a and 31b, respectively, adjacent narrow end 25 for use in bolting a second attachment means 14 to the top side of bracket 13.

Figure 6:
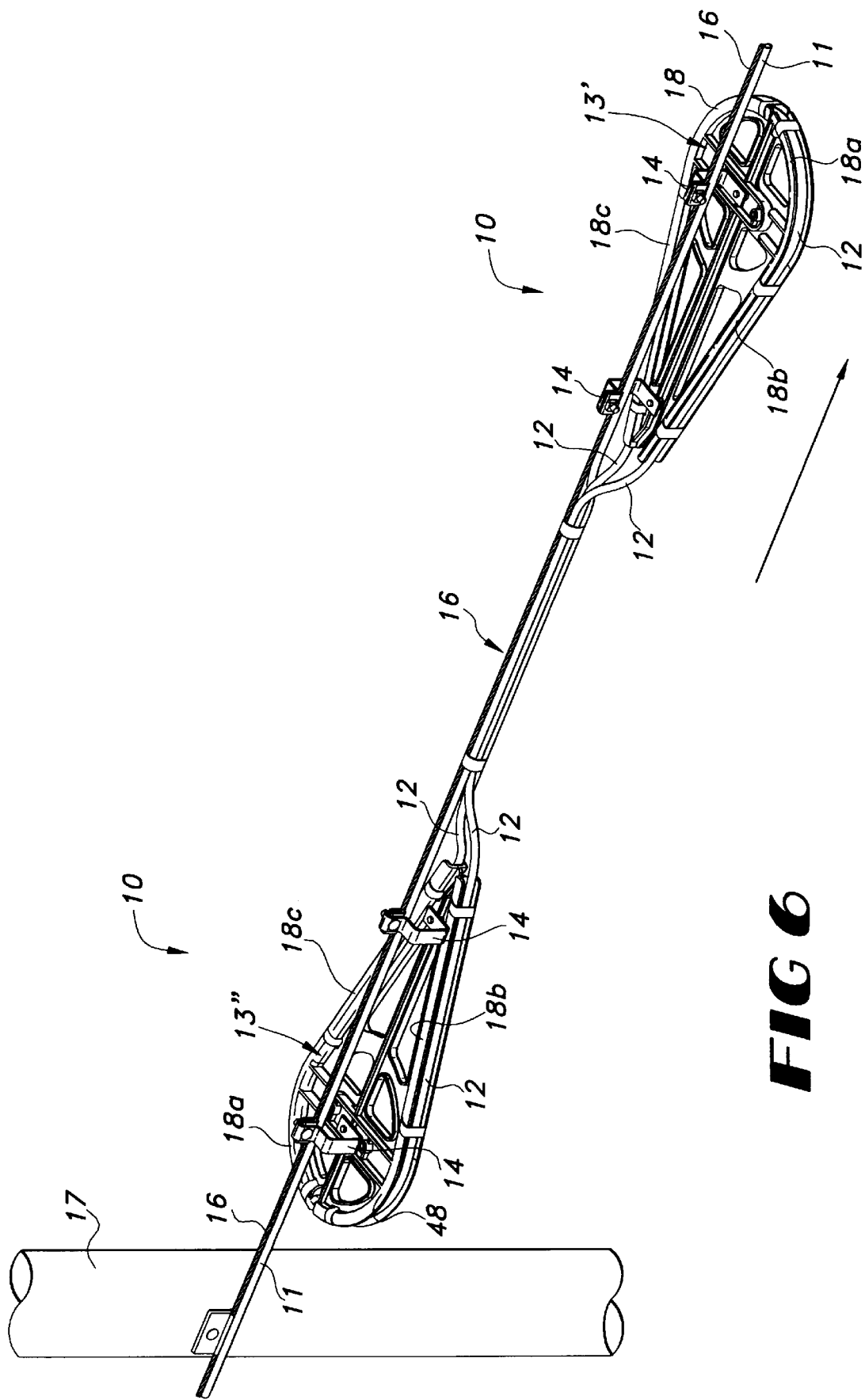
FIG. 6 is a perspective view of an aerial fiber optic cable installation embodying features of the present invention.
Figure 7:
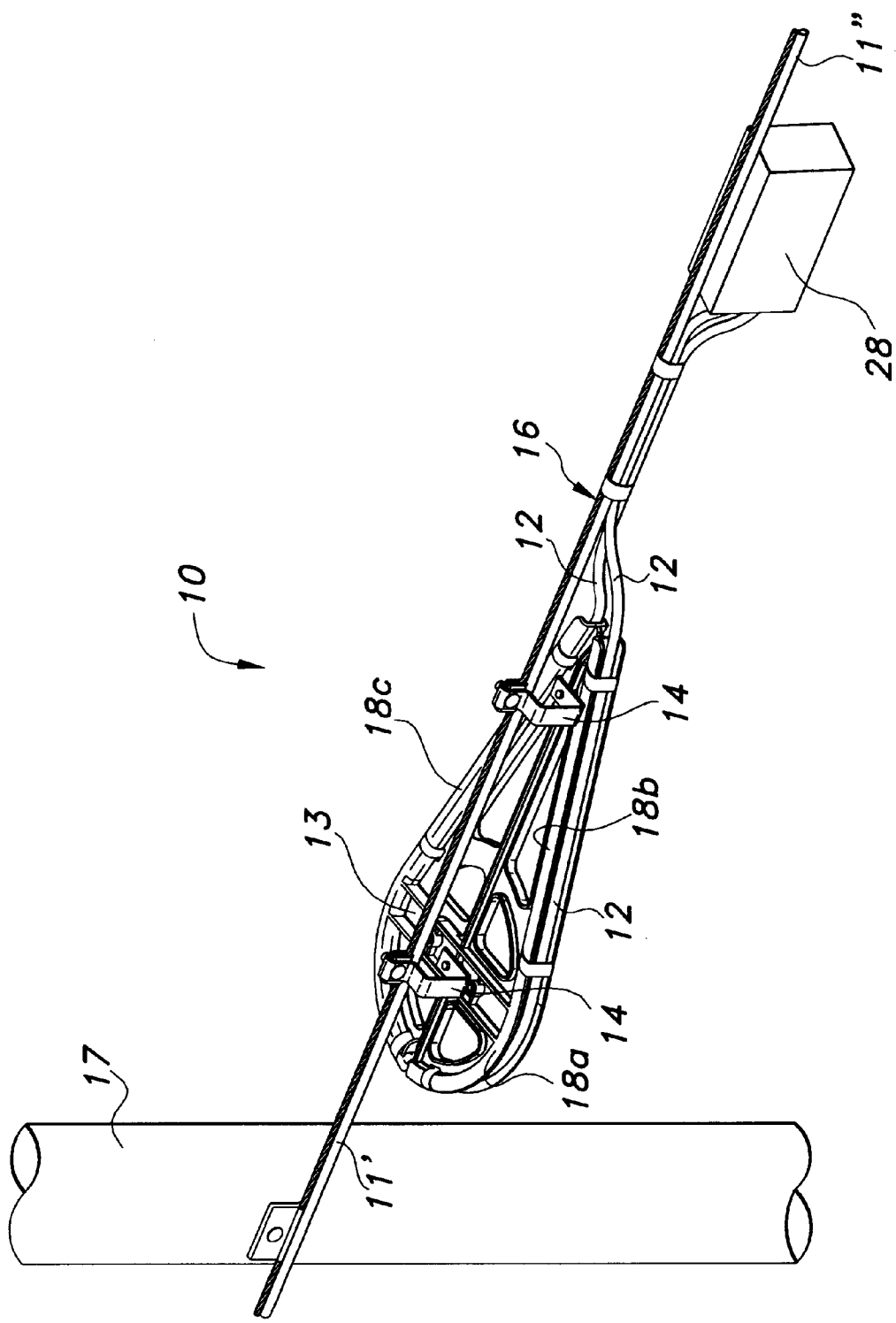
FIG. 7 is a perspective view of an aerial fiber optic cable installation embodying features of the present invention.

Once pieces 13a and 13b are mated together, bolt openings 31a and 31b through centerline members 27a and 27b become axially aligned with one another to receive a bolt 38 for bolting a second attachment means 14 to bracket 13. As shown in FIG. 3, once pieces 13a and 13b are mated together in a fully closed position, bolt openings 29, 32, 33 on cross member 23a become axially aligned with bolt openings 34, 36, 37 on cross member 23b, respectively. A bolt 39 may be received in any one of the three sets of aligned openings 29–34, 32–36, or 33–37 to bolt a first attachment means 14 to bracket 13. FIGS. 1, 6 and 7 show bolt 39 through openings 32, 36.

In the fully closed position, the bend diameter of channel means 18a is at its relative minimum. In order to adjust the bend diameter of channel means 18a, for example, to increase its bend diameter, bracket 13 may partially opened so that a different set of bolt openings in cross members 23a and 23b become aligned, as shown in FIG. 5. Thus, the array of bolt openings in cross members 23a and 23b function as a means for adjusting the bend diameter of channel means 18a. As illustrated in FIG. 5, partially opening bracket 13 to increase the bend diameter of channel means 18a causes bracket 13 to rotate about the axis of bolt openings 31a and 31b in centerline members 27a and 27b. FIG. 5 illustrates alignment of openings 34 and 32 in cross member 23a and 23b. It should be noted, however, that any number of bolt openings in cross members 23a and 23b may be provided to function as a means of adjusting bracket 13. Accordingly, the adjustability of the preferred embodiment of the present invention can satisfactorily accommodate almost the entire range of fiber optic cables presently available for aerial installation, with minor variations.

FIGS. 6 and 7 illustrate two preferred aerial installations utilizing the storage unit 10 and the methods of the present invention. In FIG. 6, it is assumed that fiber optic cable 11 originates generally from the left side of the drawing and that it has been pulled in the direction as shown by the arrow i.e., the cable 11 has been pulled (at least initially) from left to right. In this embodiment, two brackets 13 are initially attached in opposing relation to the messenger cable 16 either between utility poles 17, as shown in FIG. 6, or on opposite sides of the utility pole 17 (not shown). The location of each bracket 13 along the messenger cable 16 depends upon the amount of slack desired at the location. For example, if 60 feet of slack is needed at the site, then the two brackets 13 are placed approximately 15 feet apart.

Brackets 13 are first adjusted to accommodate the specific minimum bending radius of cable 11. The cable 11 is then drawn toward the first bracket 13 (denoted 13' in this FIG. 6). Cable 11 is then guided into the channel means 18 of the first bracket 13' starting at linear section 18b, then looping around the arcuate section 18a, and exiting toward the second bracket 13 (denoted 13" in FIG. 6) from linear section 18c of the first bracket 13'. Once cable 11 engages the first bracket 13', it is considered part of the predetermined extra length of cable slack 12.

Cable 12 is then pulled toward the second bracket 13", and is similarly looped into the second channel means 18, first into linear section 18b, around arcuate section 18a, and then exiting from linear section 18c. Cable 12 is then pulled again to the right toward the terminating end of the cable. After the requisite tensile load is applied to the installed cable, each bracket 13' and 13" is secured to the messenger cable 16. It is therefore clearly illustrated that by using the present invention, slack 12 can be easily installed and maintained at the minimum bend radius, at any convenient location along the cable 11 route. For example, "preferable" locations where slack may be maintained include areas where there is: clear pole space; easy entrance and exit; public area, or area accessible to splicing vehicles, tools and test equipment.

Turning finally to FIG. 7, a storage unit 10 is shown at a location where an aerial splice is located. In this situation, a first fiber optic cable 11 (denoted 11' in FIG. 7) from the left has been spliced to a second fiber optic cable 11 (denoted 11" in FIG. 7) drawn from the right. Here, a sufficient length of slack 12 is provided from the second fiber optic cable 11" so that the splicing operation can be accomplished on the ground. After the splice is completed, splice enclosure 28 is secured to the messenger cable 16. The slack 12 is then supported and maintained with a bracket 13, first into linear section 1 8b, around arcuate section 18a, and then exiting from linear section 18c. Excess slack 12 is pulled taut by moving bracket 13 along the messenger cable 16, at which point the apparatus is secured.

Although preferred embodiments of the present invention has been described above by way of example, it will be understood by those skilled in the field that modifications may be made to the disclosed embodiments which are within the scope of the invention as defined by the appended claims.

What is claimed is:

1. An adjustable cable storage unit utilized in the aerial installation of a cable on a utility pole or other support structure whereby a predetermined extra length of cable slack is aerially stored and maintained in a generally planar loop as part of the initial installation of said cable, said cable storage unit comprising:

(a) a bracket;
   (b) channel means positioned about the outer periphery of said bracket for receiving and guiding a portion of said predetermined length of cable slack, said channel means having an arcuate section and two converging linear sections for guiding said portion of said predetermined length of cable slack to and from said arcuate section; and
   (c) means for selectively adjusting the diameter of said arcuate section to accommodate the bending radii of a variety of cables.

2. The adjustable cable storage unit of claim 1, wherein said bracket is formed from two separate opposing hermaphroditic pieces which are generally symmetrical about a longitudinal centerline of said bracket.

3. The adjustable cable storage unit of claim 1, wherein said unit further comprises at least one attachment means for aerially securing said bracket to a messenger cable.

4. An adjustable cable storage unit utilized in the aerial installation of a cable on a utility pole or other support structure whereby a predetermined extra length of cable slack is aerially stored and maintained in a generally planar loop as part of the initial installation of said cable, said cable storage unit comprising:

(a) a bracket having first and second ends;

(b) channel means positioned about the outer periphery of said bracket for providing an essentially planar storage loop;

(c) said channel means having a bottom surface, opposing side walls extending away from said bottom surface, and an open top, for receiving a portion of said predetermined extra length of cable slack between said side walls;

(d) said channel means defining a generally arcuate section extending about said first end of said bracket to provide a return arc portion for the stored portion of said predetermined extra length of cable slack;

(e) said channel means further defining linear sections on opposite sides of said bracket, said linear sections converging from the ends of said arcuate section toward said second end for storing a further portion of said predetermined extra length of cable slack between said arcuate section and said second end;

(f) a centerline support member extending from said first and second ends of said bracket generally along a longitudinal centerline; and (g) a support cross member extending across the ends of said arcuate section, said cross member including means for adjusting the diameter of said arcuate section to accommodate the bending radii of a variety of cables.

5. The adjustable cable storage unit of claim 4, wherein said bracket is formed from two separate opposing hermaphroditic pieces which are generally symmetrical about a longitudinal centerline of said bracket, each of said pieces including a separate member which cooperate when said pieces are mated to form said cross member.

6. The adjustable cable storage unit of claim 5, wherein the means for adjusting the diameter of said arcuate section comprises an array of bolt openings through each said member of said opposing pieces, said bolt openings selectively aligned to adjust the diameter of said arcuate section.

\* \* \* \* \*